May 12, 1953 C. D. WILLSON 2,638,374
SEDAN HAVING VERSATILE STRUCTURE
Filed Sept. 18, 1947 4 Sheets-Sheet 1

INVENTOR
Corwin D. Willson

May 12, 1953 C. D. WILLSON 2,638,374
SEDAN HAVING VERSATILE STRUCTURE
Filed Sept. 18, 1947 4 Sheets-Sheet 2

INVENTOR
Corwin D. Willson

May 12, 1953    C. D. WILLSON    2,638,374
SEDAN HAVING VERSATILE STRUCTURE
Filed Sept. 18, 1947    4 Sheets-Sheet 3

INVENTOR
Corwin D. Willson

Patented May 12, 1953

2,638,374

UNITED STATES PATENT OFFICE 2,638,374

SEDAN HAVING VERSATILE STRUCTURE

Corwin D. Willson, Flint, Mich.

Application September 18, 1947, Serial No. 774,763

11 Claims. (Cl. 296—23)

This invention relates to a new type of vehicle, probably essential to survival in an atomic age, and, more particularly to a space-saving housekeeping structure, convertible while in motion or at rest to family habitation from the single driving compartment in a body of the low-slung stock family car type. This application is a continuation-in-part of my abandoned application Serial No. 458,270 filed September 14, 1942, which was a continuation in part of my now abandoned co-pending application Serial No. 437,708 filed April 4, 1942.

Since Hiroshima, our greater areas of human congestion have slowly begun to face the threat of eventual atomic destruction. To meet this danger, it has been proposed that the physical structures of such areas be widely diffused and that factories vital to national survival go underground. The costs of carrying out such proposals, however, appear so staggering as to have paralyzed attempts to cope at once with a problem on the solution of which the continued existence of our congested areas, if not our national life, may depend. Here if ever is a situation crying for the exercise of inventive ingenuity. The primary object of this invention is a practical means of implementing and temporarily maintaining mass diffusion from congested areas threatened with atomic attack, and in a manner related to proved public preferences, to mass production techniques and to prevailing trends.

Today's family car can diffuse but it cannot shelter and maintain a family thus diffused in comfort and decency, even though today's motorcar body has become part of the total shelter of the average American family, and constitutes the dynamic part of that total, the part about which much of our peacetime industrial activity revolves. However, the family car still observes the traditions of horsecoach design wherein styling went far to embrace minimal utility for purposes of conspicuous display. In consequence today's family car may be said almost completely to lack utility when parked, which may average 95 per cent of the time. Even in face of the rapid growth in popularity of the trailer coach, the design of the motorcar continues to be aimed at the satisfaction primarily of occasional, thus largely limited and luxury needs and tastes, and fails to heed the implications inherent in the spectacle of a vehicle that has no utility when parked towing about a much larger vehicle that has no utility in motion. Obviously, today's family car, while as numerous as dwellings, would fail, under threat of atomic attack, to meet the need of millions of families simultaneously for widely diffused family shelter during an emergency probably timed to occur in mid-winter and to be of some duration. Yet, once some practical: i. e., simple and economically possible, means is found for making the average car quickly convertible to housekeeping use, then the threat of the atom bomb to our cities loses some of its menace. Once swift mass diffusion is properly implemented, it becomes susceptible to military organization. The city might be bombed, but its population could be saved.

Since the term, "housekeeping," may be loosely applied to any result obtained as to keeping things in order, the term as used herein means what is meant when rentable space is advertised as "housekeeping room" or "housekeeping apartment." More specifically, "family housekeeping structure," as used herein, means a housing, specially ventilated because of its small size, for inbuilt facilities of family repose in upright and horizontal position and about a temporarily fixed table and for the storage of clothing and bedding and cold food and for the preparation of hot food and for the cleansing of dishes and occupants, and adequate for the constant habitable use of all members of an average American family at the same time. By "convertible" is meant manipulatable to be changed from a condition primarily of constant use in habitation to one primarily of intermittent use in transport and vice versa. By "body of the low-slung stock family car type," as used herein, is meant a rigid body of fixed size and of a size proved within mass economic reach and having a floor for the main driving-passenger compartment contained between the rear of the front roadwheels and the rear axle and aligned with the lower half of the roadwheels. More specifically, "stock family car" refers to a medium-sized car of below 120" wheelbase, 56" tread, overall dimensions 6' x 16', weight 3300 lbs.

The average inside dimensions of today's stock family car are such as to provide a volume only slightly more than half that of a typical camp-car of prior art, and the floor of today's stock family car is aligned with the lower halves of the roadwheels and below the differential and rear axle, room for the vertical displacements of which in rough transit must be provided. The addition of a second compartment behind the driving compartment and which must be physically entered on foot to be utilized has become impractical and the cost of even smaller than average stock family cars has risen to a point where that campcar of 132" wheelbase and its costly expansibility in securing family habitability offer no economically feasible pattern for properly sheltering mass diffusion under threat of atomic attack.

The solution to the problem of making the body of the stock motorcar family-habitable apparently does not appear in the prior art. Seats convertible to berths for two persons and similar piecemeal attempts to improve the parts of existing cars are numerous but they fail to add up to the invention hereinafter described. A stock car differs from a custom-built one in that the stock car must be mass produced. This means that its fabrication depends on turning out hundreds of thousands of closely identical models for which an effective demand exists because each model in greater part is in step with available purchasing power and habitual public acceptance. To achieve habitability, it is necessary to have a kind of car which in all other respects may be 90-98 per cent completed on the production line as a stock car meeting established wide demand as an economic means of transport and lacking convertible features. On the basis of such a car, some and increasingly more units from the production line, as demand warrants, can be finished 100 per cent by inclusion of the convertible features hereinafter to be described in the 90-98 per cent completed stock car. Invention should be encouraged to operate with some slight reference to the practical considerations, developed through 50 years of trial and error, which make the stock car itself possible. Thus, another object of the invention is a potentially convertible housekeeping structure which is 90-98 per cent completed as a stock car and which may be 100 per cent finished wholly for transport and without other features, or, may be finished to include convertible features for habitability.

Another object of the invention is a space-saving convertible housekeeping structure having a housing of extremely limited fixed volume. In the specific structure hereinafter described, the floor of the major passenger compartment extends between the rear of the front wheelwells and the front of the rear wheelwells and has an area of approximately 36 square feet, and the inside of the body between front and rear minor compartments has a width averaging a few inches over 5 feet, and a length averaging approximately 8 feet and a height averaging under 5 feet. This limits the inside volume to approximately 200 cubic feet. While the invention is not limited to any exact dimensions, it should be noted that in the specific structure to be described, the space available for convertibility is little more than normally is required in transport only in two-seated cars of the lower-cost sedan type. In ways hereinafter described, the invention achieves about 50 cubic feet of body space more than commonly is available in stock family cars of the same tread and wheelbase and without increasing overall car length and width.

Another object of the invention is a convertible housekeeping structure having a housing comprising a single passenger-driving compartment contained lengthwise between the rear of the front wheels and the front of the rear wheels and, in addition, minor enclosures between the rear wheels and above and forward of the rear axle and opening at some distance above the floor of the passenger compartment into that compartment but closed to a rear compartment extending backwardly below a rear-view window in the back end of the passenger compartment; the minor enclosures including facilities for the proper storage of bedding, clothing, cold food, and an in-built sanitary plumbing facility and a closable cabinet having grease-resistant, sanitary walls and an in-built combustion burner and ventilating means supplying air thereinto when closed and expelling fume directly therefrom.

Another object of the invention is a careful masking of visual evidence (a) in the accepted form of the body and (b) in the manner of providing cooking, dining, cleansing and sleeping facilities adequate to the needs of an entire family, that so much increased utility may have been added to the stock family car for the purposes described, or that such domestic use is contemplated or possible. This object of the invention is in need of particular emphasis. So long as motorcars are designed as a luxury product advertising the superior economic and social status of the new-car buyer, it would be futile to aim at a greater mass utility by making motorcars more useful both in swift transit and when parked unless this plebeian quality can be slipped into modish models surreptitiously. One of the novelties of the invention is that it provides a workable means of achieving by degrees on present production lines a family car equally useful in local transport and in family habitation. Such a car long has been needed even for ordinary long-distance touring. But if the mass utility of the American stock family car is to be thus increased, it must be without the slightest outward stigmata of what the more affluent of new car buyers might consider "utilitarian vulgarity."

Another object of the invention is a convertible housekeeping structure having the seating and convertible berths asymmetrically disposed therein relative to the lengthwise center axis of the structure.

Another object of the invention is a convertible housekeeping structure having an unbalanced design load on opposite ends of the structure and a system of wheel suspension operative to counteract in rough transit the otherwise ill effects of such a structure.

These and other novel features and objects of the invention are hereinafter more fully described and claimed, and the preferred form of such a convertible housekeeping structure having for a housing an improved stock family car of the sedan type—low-slung and teardrop shaped— is shown in the accompanying drawings in which:

Figure 1:
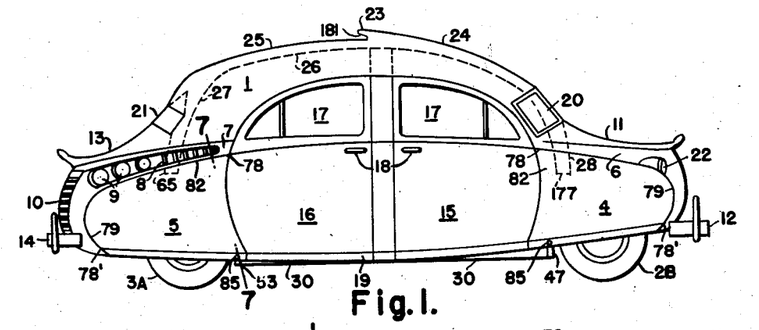
Fig. 1 is a view of the right side of the exterior and shows the general character of the housing for the housekeeping structure.

As indicated in Fig. 1, the preferred form of housing or body 1 cleaves closely to the accepted mode where the passenger compartment is positioned between much lower end compartments to give the streamlined "teardrop" shape of popular preference. Contributing to the factors holding the car body, in spite of changes in structure hereinafter described, closely to the appearance of a stock family car of the "sedan" or "coach" type are front roadwheels 2A and 2B, rear roadwheels 3A and 3B, front fender 4, rear fender 5, front fender support 6, rear fender support 7, louvres 8, air-scoops 9, radiator grill 10, front hood 11 above front bumper 12 and rear hood 13 above rear bumper 14, front door 15, rear door 16, each door with window 17, handle 18 and side bumper or moulding 19, front window or windshield 20, rear window 21, headlight 22. Undercut comb or step 23 in backwardly and upwardly inclined frontal area 24 of car roof 25 opens into main top duct 26 of ventilating system having rear extension 27, front extension 28 and middle extension 29, the purpose of which will be hereinafter described.

Figure 2:
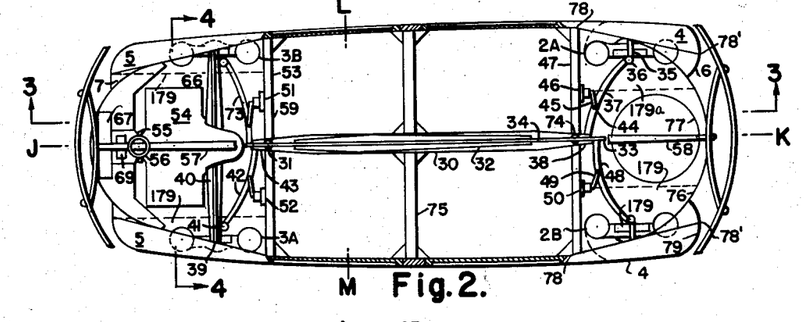
Fig. 2 is a plan of the body structure.
Figure 3:
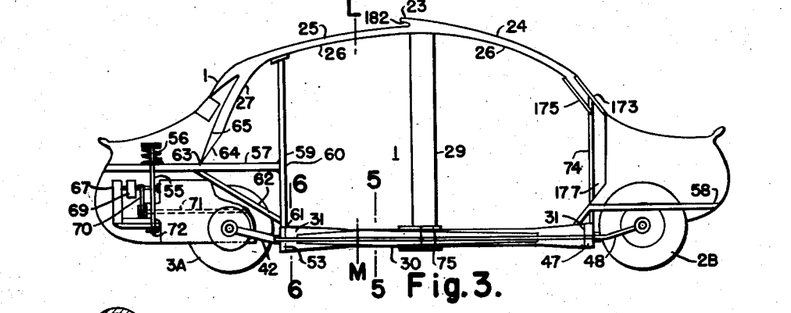
Fig. 3 is a longitudinal section on line 3—3 of Fig. 2.
Figure 6:
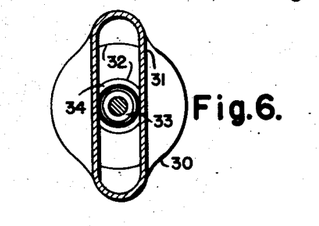
Fig. 6 is a section of the backbone on line 6—6 of Fig. 3.

In Fig. 2, body 1 is shown stiffened by backbone 20 round in section throughout much of its length but deformed to ovular at opposite ends 31 as seen in Fig. 6. Diagonally opposite roadwheels 2A and 3A are linked by elements housed in backbone 30 and including tubular tilting beam 32 tapering toward opposite ends from its one point of contact with backbone on the transverse turning axis l—m of backbone 30. Beam 32 supports with lateral rigidity a small diameter spring rod or torsion tube 33 inside another resilient tube 34 of equal flexibility. Left front wheel 2A is mounted for rotation on steering spindle 35 which pivots by means of kingpin joint 36 on the outer end of rigid suspension arm 37 having at its inner end, hub 38 fixed as by spline to front end of tube 34. Right rear roadwheel 3A is mounted on driving axle 39 in housing 40, which, close to roadwheel 3A, is operatively joined as by shackle 41 to outer end of rigid suspension arm 42 having at its inner end hub 43 fixed to the rear end of tube 34. Front suspension arm 37 and rear suspension arm 42 thus, through mutual connection with tube 34 housed in beam 32 are supported on even ground at only a single point of body contact: i. e., the backbone 30 on line l—m. In passage over uneven ground, front suspension arm 37 through operative connection 44 with lever arm 45 of shock absorber 46, such as one of hydraulic type fixed to front crosstie and floor stiffener 47, is given another point of body contact, but a yielding one. Through parts 34, 35, 36, 37, 38, 39, 40, 41, 42 and 43, left front wheel 2A is thus resiliently linked with right rear wheel 3A, this linkage being carried by beam 32 so that opposite ends of tube 34 may be twisted in opposite directions, may turn in the same direction and may see-saw on line l—m within the restrictive limits of backbone 30. Through similar parts right front wheel 2B is resiliently linked through tube 33 with left rear wheel 3B. The two linkages 2A—3A and 2B—3B are integrated by the concentricity of beam 32 with rod or tube 33 and tube 34 which compels their concerted pivotal movement on line l—m in backbone 30.

When wheel 2A is displaced upwardly over a road bump, the outer end of front suspension arm 37 applies leverage to rotate the front end of tube 34 in a counter-clockwise direction. So far as this rotation is resisted by leverage exerted by the outer end of rear suspension arm 42 on back end of tube 34, much of the shock of impact on wheel 2A is absorbed in twisting tube 34. So far as tube 34 stiffly resists this distortion, the shock of initial up-impact on wheel 2A is converted into a down-impact on wheel 3A and absorbed into the tire on wheel 3A. Taper in tilting beam 32 permits part of the up-impact on wheel 2A to tilt front hub 38 upwardly which tilts rear hub 43 downwardly. This lifts both outer and inner ends of left front suspension arm 37 simultaneously at the same time that both outer and inner ends of right rear suspension arm 42 are being simultaneously depressed. By this means, the effect of a parallelogram wheel mounting for each roadwheel is achieved. Shock absorbers 46, 50, 51 and 52, tend, by leverage on crossties 47 and 53 to keep body on an even keel and all roadwheels pivot directly upon the point of least body movement in passage over uneven ground. The particular relevance of this suspension system to the housekeeping structure being described will later appear.

Figure 4:
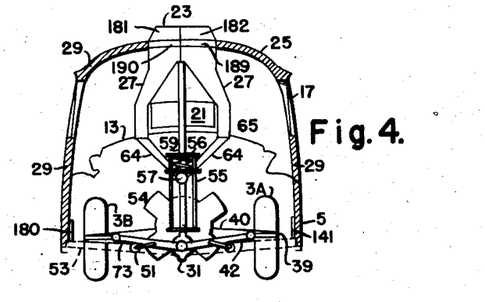
Fig. 4 is in part a transverse section on line 4—4 of Fig. 2.
Figure 5:
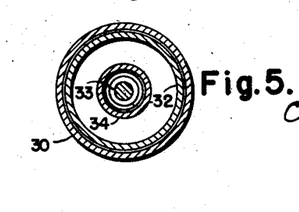
Fig. 5 is a section of the backbone on line 5—5 of Fig. 3.

Propulsion is by means of unit 54, such as an 8 cylinder internal combustion X engine, change speed mechanism and differential all rigidly integral with axle housing 40. The resilient mounting of propulsion unit 54 upon the body 1 is shown in Figures 2, 3 and 4. rearward portions of unit 54 being suspended by long shackle 55 on single helical spring 56 supported on overhead strut 57 which comprises in fact a rearward extension of the backbone 30 just as strut 58 comprises a forward extension of backbone 30 whereby the entire midportion of the body 1 and backbone 30 itself may be described as swayback and underslung; each strut serving to support rear and front extremities of body 1. The forward end of strut 57 is fixed to vertical column 59 at a midpoint 60 and the bottom of column 59 is fixed to backbone 30 at the point of juncture 61 of the ovular end 31 of backbone 30 with rear crosstie 53. In Figure 2 the lines indicating the actual junctures of struts 57 and 58 with backbone 30 are purposely broken to clearly show mountings of right and left fore and aft suspension arm hubs upon torsion elements 33 and 34, but these lines of juncture are clearly defined in Fig. 3. Diagonal brace 62 at the lower end is fixed to column 59 and at the upper end to a midpoint 63 of strut 57; and a pair of diagonal braces 64 are fixed at the lower ends to the same midpoint 63 and at the upper ends to the forked ducts comprising rear extension 27 of the system of ventilating ducts for body 1; ducts 27 having opening 65 immediately below hood 13 of power-drive compartment 66 and later to be explained. Radiator 67 is cooled by air from louvres 8 and airscoops 9 flowing through duct 68 to fan 69 run by belt 70 on engine shaft 71 and radiator 67 together with rearward portions of propulsion unit 54 are supported by outer end of strut 57, the weight thereon being carried by diagonal 62 and column 59 to that part of backbone 30 lying closely adjacent to transverse turning axis $l-m$. By removing shackle pin 72 and unshackling outer ends of rear suspension arms 42 and 73 from axle housing 40, the entire power-drive mechanism is removed from the body 1 for service or replacement.

The body is designed for maximum torque-resistance and rigidity. Rear column 59 and front column 74 fixed to opposite ends of backbone 30 have upper ends supporting opposite ends of an upwardly bowed box truss formed in part by roof 25 and in part by the sides and bottom of duct 26 fixed to roof 25. Body load is thus carried by a rigid frame of depth equal to the body height, a frame comprising parts 25, 26, 30, 59 and 74 and braced by parts 57 and 62, all of which parts lie in the same vertical plane as line $j-k$ of the lengthwise central body axis. The body is stiffened transversely by middle crosstie and floorstiffener 75 and middle extensions 29 of the ventilating system which together ring the body between backbone 30 and roof truss 25—26. Front hood 11 lifts to give access to storage compartment 76 holding spare tire 77, sides of wheelwells between tire 77 and front roadwheels being left out of drawings for simplification and better understanding of the mechanical and structural features.

Front fenders 4 could be shown with the semicircular open side usual in front fenders. But drawings show both front fenders 4 and rear fenders 5 without open outer sides. Body 1 has a lengthwise horizontal section like that of a double-yolked egg with the broader end foremost and the front tread is slightly narrower than the rear tread, which provides adequate clearance for steering front wheels 2A and 2B. To remove tires, all fenders are made easily demountable in toto. Between front fender support 6 and front fender 4, the lateral jointure on line 78—78' is shown in Fig. 1 as recurved or fishhook shaped at the front end 79 of the fender. A similar structure for rear fender 5 is shown in section in Fig. 7 as comprising a continuous shallow socket 80 which receives therein the flanged edge 81 of the top 82 and end 79 of the fender. Receiving socket 80 may comprise a channel strip fastened to the support 7 or comprise an integral deformation of said support. Binding strip 83 of organic material and having exterior bead 84, softens contact between flange 81 and socket 80 and covers the line of jointure 78—78' against the weather. To remove fender 5, it is only necessary to remove single fastener 85 with tirewrench from crosstie 53, whereupon entire fender as an integral unit is freed by drawing recurved flange 81 laterally toward line $l-m$ until flange 81 clears socket 80.

Figure 8:
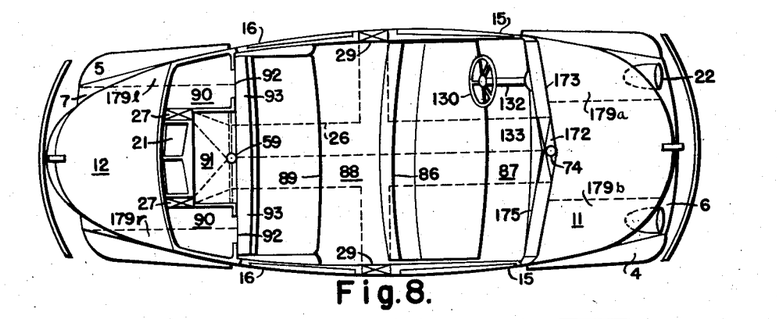
Fig. 8 is a body plan of the structure when completed for use in transport and without convertible housekeeping features.

In Fig. 8, body 1 is shown divided by an anchored front seat 86, holding three occupants, into front seat space 87 and rear seat space 88. To pass from one to the other, it is necessary to stop the car and make the shift outside the body. Immediately back of rear seat 89 are dustproof closets or wardrobes 90 at opposite ends of luggage space or dresser unit 91 with top under and forward of rear window 21. Closets 90 and dresser 91 may be made as separate units added to stock body 1 or left out, depending on what sort of model it is desired to complete from a car 95 per cent or more stock to this point. Space occupied by closets 90 and dresser 91 may be used alternately as a luggage space or a seat similar to rear seat 89 may be pushed back to provide a larger space 88 to receive seats folded into the back of front seat 86 in a manner commonly in use and not here shown. Dust-tight opening closures 92 give access to closets 90 above back 93 of rear seat 89, a portion or all of back 93 being tiltable forward or removable to permit easy access to space or dresser 91.

Figures 7, 16, 17, 18, 19, 20:
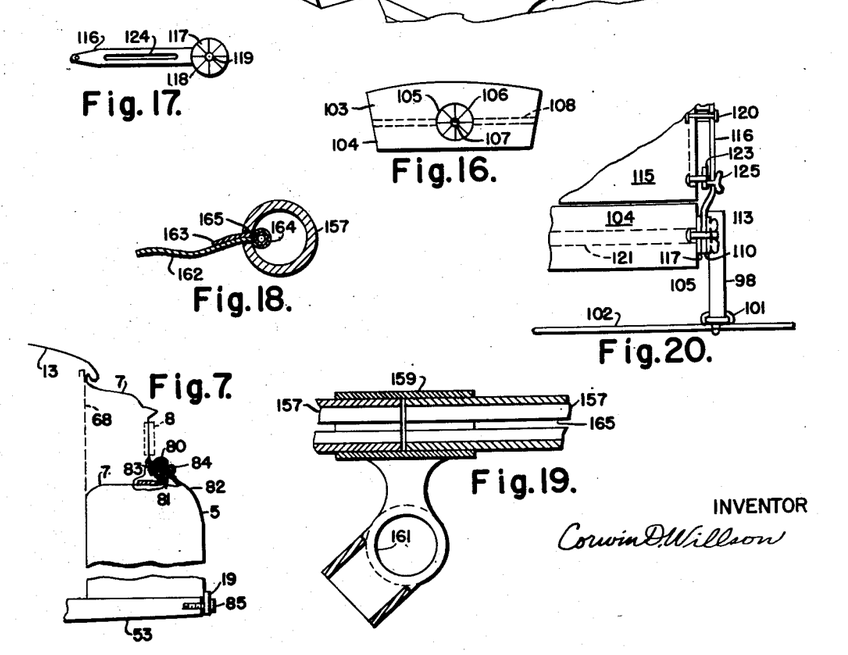
Fig. 7 is a section of the fender on line 7—7 of Fig. 1.
Fig. 16 is an end view of bottom cushion of front seat.
Fig. 17 is a side view of main support arm for back of front seat.
Fig. 18 is a section on line 18—18 of Fig. 15.
Fig. 19 is a section on line 19—19 of Fig. 15.
Fig. 20 is a side view of part of the convertible front seat.
Figure 9:
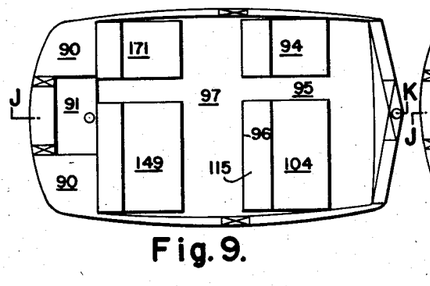
Fig. 9 is a plan of essential parts of the same body as in Fig. 8 where traditional seating has been replaced in whole or in part by convertible seating, all seats in forward-facing position.
Figure 13:
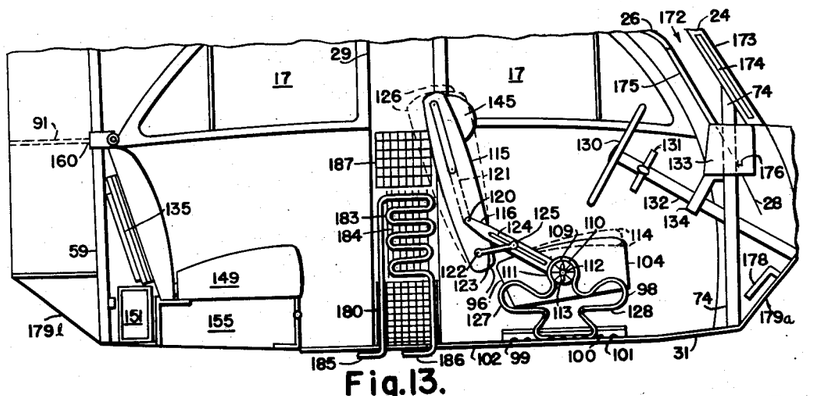
Fig. 13 is a vertical section on line 13—13 of Fig. 9 looking toward driver's seat and cutaway heat-transfer unit in wall duct.

It is to be noted in Fig. 8 that widest part of the body is found between front and rear fenders, and in Fig. 3 that the decided upward bulge of the roof provides slightly more height amidships than is found in the average car. Transfer of the prime mover to the rear of the body also provides a roomier body lengthwise. This permits a gain of nearly 50 cubic feet in the volume of the major compartment (passenger-driving compartment) without increasing overall width and length of the car and without increasing width of tread and length of wheelbase. Advantage of this gain in cubage is taken to achieve the structure shown diagrammatically in Fig. 9. Heretofore the seating in the stock family car has been arranged symmetrically relative to the lengthwise center axis of the body: i. e., the parts on one side of that axis have balanced parts on the opposite side. In Fig. 9 this traditional practice is abandoned and the seating is fixed asymmetrically relative to that axis. Driver's seat 94 is separated by a less than aisle-width gap 95 from double front seat 96 which stands on opposite sides of axis $j-k$. By the provision of a gap even narrower than that indicated at 95, it becomes possible for occupants to shift from front to rear seats without getting out of the car and thus the two separate compartments 87 and 88 are merged to become one compartment 97 in Fig. 9. In Fig. 13, seat 96 is shown to comprise a clover-leaf shaped end support 98 with bottom notches 99 coactive with nibs 100 in channel 101 fastened to body floor 102 by means which permit support 98 to be shifted relative to line $l-m$ to increase or decrease leg room of seat occupants, and relative to line $j-k$ to temporarily close gap 95. (Future lawmakers may see the wisdom of compelling a fixed gap between the driver and too agreeable companions to decrease present highway hazards.) Secured to end 103 of bottom cushion 104 of seat 96 is disk 105 with concave-convex graduations 106 spaced about a central threaded projection or gudgeon 107 anchored to interior framework 108 of bottom cushion 104 which cushion is made individually resilient by any one of various internal means common in the art and not here illustrated. Support 98 carries fixed to an upper middle portion 109 a disk 110 with concave-convex graduations 111 about a central hole or bushing 112 into which gudgeon 107 fits for rotation except when graduations 106 fit into graduations 111 and are firmed or locked tightly one into the other by means of tightening wingnut 113 on threaded gudgeon 107. By this means the angle of inclination of bottom cushion 104 relative to floor 102 may be changed to that suggested by dotted lines 114 or to such other angles as the graduations on the respective disks are intended to permit. This provides accommodation to a wide variety of seat occupant contours. It long has been recognized that existing car-seating arrangements are so inflexible as to give occupants no choice on a 500 mile tour but to sit at a predetermined angle having little relevancy to their own particular contours. Fatigue, inevitable where the muscles of a seat occupant's body are held too long at an unvarying angle, may thus be eased. The relative position of back cushion 115 of seat 96 is independently changed to a desired angle by similar means. As shown in Fig. 17, main support arm 116 comprises a lower end fixed to disk 117 with concave-convex graduations 118 about central hole 119 which also fits on gudgeon 107 coactively with disks 105 and 110. At the upper end, arm 116 is pivotally joined by fastener 120 to the inner framework 121 of the back cushion 115 which is upholstered by means (not shown) common to the art whereby opposite faces of cushion 115 are both resilient. Upon pivotal fastener 122 to framework 121, control arm 123 has forward end secured within the constraint of slot 124 in main support arm 116 by means of wing-nutted fastener 125, which, loosened, permits the angle of the back cushion 115 to be varied as suggested by broken lines 126. By altering the relative angle of arm 116 by means of wingnut 113 separately from or in connection with shifting the position of the forward end of arm 123 in slot 124, an extremely wide range of back positions fits the seat 96 to widely varying occupant contours and permits a shift in individual fixed posture on tour in the seat. Adjustments to seat 96 may be made while the body 1 is in motion and while the driver occupies seat 94.

The object of the cloverleaf shape of support 98 is to supply a special form of spring for the seat 96 that permits bottom 104 and back 115 to move up and down under road shock as a unit, and that part of bottom 104 under the knees to move less than that part under the hips of the seat occupant. When an occupant is sitting in the seat shown in Fig. 13, body weight rests in greater degree on rear spring loop 127 of support 98 and leverage exerted by backward pressure on seat back 115 is resiliently resisted by forward spring loop 128. Loops are timed in their rate of flexibility to the rate of tubes 33 and 34 in the wheel suspension system. Flexibility of the loops is adjustable by means of turn-buckle screw 129 which, turned clockwise, acts to lengthen and limber loops 127, 128 simultaneously and in identical degrees and, which turned counterclockwise, acts to shorten and stiffen loops 127, 128. In this manner, seat 96 may be made more or less flexible under a given weight and brought into time with the spring rate of tubes 33 and 34. With a support 98 at each end of seat 96, and independent adjustments in seat back and seat bottom angles and in spring flexibility possible at each support, it becomes possible to make double seat 96 conformable to the different weights and contours of two different seat occupants. Displacement of both seat bottom and back in the same vertical plane saves wear on seat covering and clothing in addition to easing the ride.

Figure 10:
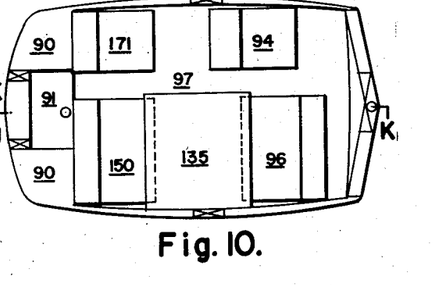
Fig. 10 is a plan of the same body when back of convertible front double seat is reversed to permit occupants to face a table.
Figure 14:
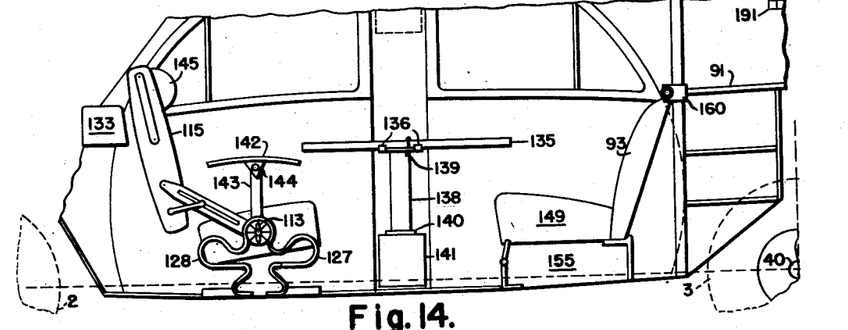
Fig. 14 is a vertical section on line 14—14 of Fig. 10.

Steering wheel 130, with motor-control 131 on column 132 firmed to instrument panel 133 by bracket 134, projects according to accepted practice rearwardly over the front edge of driver's seat 94. By building the backs of seats 94, 96 separate and by slightly increasing the space commonly available forward of and above seat 96, it becomes possible by the mechanism described to swing backcushion 115 in a vertical arc from forward-facing as shown in Fig. 13 to rearward facing as in Fig. 14. While body 1 is in motion on highway with driver behind steering wheel 130 seat 96 may be shifted from the condition shown in Fig. 9 and the two occupants of seat 96 may step through gap 95 to sit in seat 96 as shown in Fig. 10 for easier conversation with rear seat occupants or to make use of demountable folding table 135 which, when not in use as set up for games or dining, is stored behind rear seat as indicated in Fig. 13. Hooked flanges 136 on table 135 fasten the table temporarily firmly into receivers 137 on body 1 and leg 138 hinged at 139 is demountably fastened to receiver 140 on upper lip of grill 141 over opening near floor 102 into duct 29 of the ventilating system. Arm rest 142 adjustably joined to support 143 by fastener 144 may be locked by wingnut 113 into the seat assembly on gudgeon 107 by means of disk (not shown) fixed to lower end of support 143 and similar to disks 105, 110 and 117. Because loops 127 and 128 are identical, reversal of the seat back 115 by exactly reversing the function of each loop changes in no whit the action of the seat springing. Head pillow 145 may be switched from one side to the other of seat back 115 or dispensed with entirely.

Figure 11:
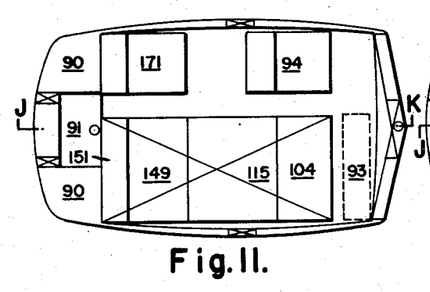
Fig. 11 is a plan of the same body with front and rear double seats converted to form a double chaise longue or berth.
Figure 15:
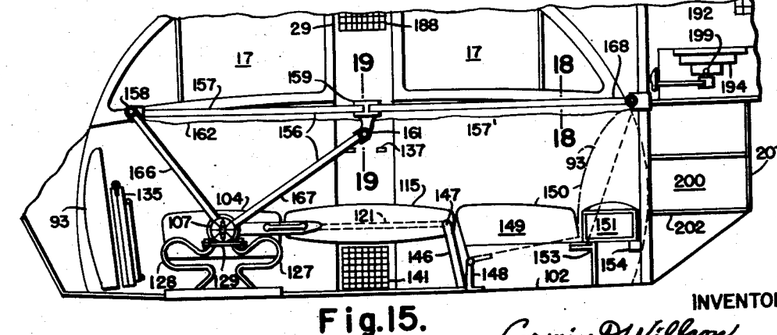
Fig. 15 is a similar section after conversion of seats to berth and erection of upper berth from stored parts.

As shown in Figures 11 and 15, the mechanism described permits seat back 115 to be shifted to a position back of seat bottom 104 so that upper surface of seat back 115 is roughly parallel with floor 102 and its rearward extremity then rests on retractible leg 146 joined by pivotal fastener 147 to inner frame 121. Seat bottom 104 is also lockable in position where the upper surface is roughly parallel with floor 102. By means of pivotal front support 148 for the bottom 149 or rear seat 150, the upper surface is brought level with the leveled seat back 115 to provide a comfortable double chaise longue. The pleasure of a motorcar airing for many an invalid is currently possible only in an ambulance, but by the means described it is possible to provide mobility in comfort even for the convalescent or bedridden in a stock family car thus equipped. By removal of the rear seat back 93 from position indicated in Fig. 15 by broken lines to storage where shown by unbroken lines and by placing box 151 having padded top 152 on rear seat support 153 and cleat 154 fixed to columnar member 59, a berth of adult length and 34″ wide is provided, the bedding for which is stored in dustproof closets 90, in dresser 91 or in the storage compartment 155 under rear seat 150. Box 151 contains the nested sectional and coactive parts for upper berth 156, and box 151 normally is stowed behind rear seat 150 as shown in Fig. 13. Berth 156 comprises tubular sections 157, 157″, front connectors 158, middle connectors 159 and rear connectors 160, all of which parts push-fit (telescope) together to form the horizontal peripheral frame with middle spreader 161 supported at some distance below the textile berth bottom 162 having reinforcement 163 providing edge-bulge 164 that feeds into tubular sections 157, 157' by means of longitudinal slot 165 in said sections. Front diagonal braces 166 at opposite ends of front seat 96 join front connectors 158 with gudgeon 107. Rear connectors 160 are mounted on column 59 and other body parts in a pivotal manner whereby forward end of berth 156 under road shock moves up and down upon spring loops 127 and 128 in time with tubes 33 and 34. The forward end of the lower berth described is similarly sprung so that the forward ends of upper and lower berths move simultaneously and in like degree relative to floor 102.

Figure 12:
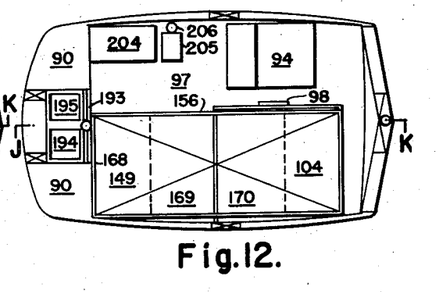
Fig. 12 is a plan of the same body showing an alternate method of forming lower berth and another demountable double berth set up above the berth shown in Fig. 11.

Except for means levelling bottom 149 of rear seat 150, this seat is conventional and back 93 is not required in making up a berth of front and rear seats. In Fig. 12, an alternate arrangement is indicated whereby rear seat back 169 is shifted forwardly to lie with upper surface supported level with the upper surface of a front seat back 170 shorter than 115. With their upper surfaces approximately in one plane, front seat bottom 104, rear seat bottom 149 and seat backs 169 and 170 are alternately combined to provide an adult length berth without use of box 151 as a fill-in. In this instance, front seat bottom 104 is first shifted forward in channels 101 and rear seat bottom 149 is shifted rearwardly against closet 90 and dresser 91 before filling in the space between with seat backs 169 and 170. Whatever the means used to secure the double-decker sleeping unit of the bunk-bed type for four passengers, components of both upper and lower double berths for said unit including supporting columnar member 59 of the primary framework of the body when seats are restored to normal sitting position, little visual evidence suggests that four occupants may be accommodated in horizontal position while a fifth is driving and a sixth sitting. In spite of the space limitations, the asymmetrical structure permits occupants of seats and berths to move about freely in the passenger compartment both when the body is in motion and when it is parked, and to leave the compartment swiftly in case of accident or fire, and this with a minimum of inconvenience to each individual occupant.

With the provision of means for the constant occupancy of such a small space, regardless of the season or weather—and during part of the time, windows would have to be kept closed—an improved system of ventilation becomes necessary. The use of a system of ventilating ducts in the top and opposite sides of the body as a primary body stiffening has been described. This system of ducts is shown in part by the broken lines of Fig. 8. In Fig. 13 front extension 28 of the ventilating system is shown to comprise in part a duct 172 between transparent opposite sides, the outer of said sides being a transparent windshield 20 having a glazed or plastics covering 173 held by a rigid central mullion 174 of metal or of reinforced transparent plastics. The mullion 174 is attached at the lower end to column 74 and at the upper end to roof 24 and duct 26. The inner side of duct 172 comprises transparent plastics sheeting 175 above instrument panel 133, a portion 176 of which carries duct 172 downwardly to opening 177 immediately above control pedal 178 adjacent left front wheelwell 179a. Back of left front wheelwell 179a and right front wheelwell 179b coincides with front of crosstie 47; and front of right rear wheelwell 179r and of left rear wheelwell 179l coincides with rear of crosstie 53. The purpose of the double windscreen is: first, it forms part of the ventilating and heating system of the body; second, it thereby makes impossible the frosting of outer covering 173; third, it reduces the hazard of the front seat passengers of being badly cut in case of accident; fourth, by fixing covering 173 at a different angle relative to the driver's line of vision than covering 175, it is possible to deflect much of the blinding glare of oncoming headlights and the material of covering 173 may be made coactive with the material of covering 175 to accentuate this deflection by polarization.

Figure 21:
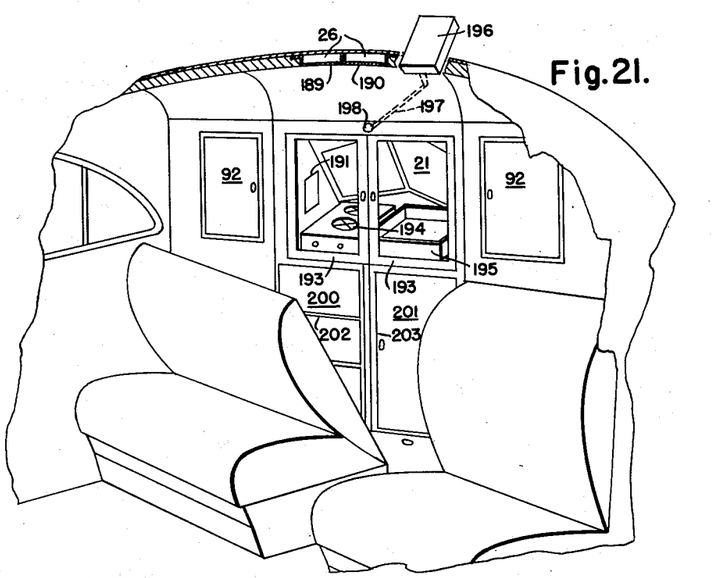
Fig. 21 is a view in perspective of the back interior of the body showing the minor enclosures accessible from the passenger compartment and separating the passenger compartment from a rear compartment.

Middle extension 29 of the ventilating system in the left side of body 1 comprises a substantial duct between doors 15 and 16 on opposite sides of the body and carrying grilled opening 180 adjacent floor 102 and opening 180 is an inlet or outlet according to whether air is being forced into opening 181 and from opening 182 in roof-step or comb 23 shown in Fig. 4, or from opening 181 and into opening 182 in the manner described more fully in my copending application Serial No. 458,270 above mentioned. In cutaway, heat exchange coil 183 with fins 184 is shown within duct 29 in Fig. 13 connected by inlet 185 and outlet 186 with a circulating supply of hot water from cooling jacket of propulsion unit 54 (means not shown), or connected with a combustion space heater hereinafter described, or with a refrigeration unit (not shown). By this means, air forced through the body-stiffening system of ducts may be heated or cooled, and a gravity system of heat-transfer and ventilation, as boosted by an electric fan or blower (not shown) may utilize opening closure 187 as an outlet and opening 180 as an inlet. In Fig. 15, middle extension 29 of the ventilating system in the right side of the body carries lower grilled inlet or outlet 141 and upper opening closure 188, the latter for directly ventilating upper berth 156 with windows 17 closed. In Fig. 21 ventilating duct 26 is shown to comprise two independent parts 189 and 190, one part connected with opening 181, the other with opening 182 and each part carried at the back of the body downwardly on an opposite side of rear window 21 by ducts 27 to power drive compartment 66 as described. By this means, fresh air is carried to and hot or foul air from compartment 66, and by means of opening closure 191 into duct 27 and a similar opening closure (not shown) in opposite leg of duct 27, fresh air is taken into and fume is exhausted from the space above dresser 91 and between wardrobe closets 90 when transformed into cabinet 192 enclosed by doors glazed to permit view through rear window 21. Since the inside of passenger compartments are now covered with cloth which would be easily soiled by cookery, the walls of cabinet 192 back of glazed doors 193 are made of grease-resistant sanitary material. To top of dresser, thus become part of cabinet 192, is fixed a means of hot food preparation, such as combustion-burner cookstove 194, fitted when not in use with a demountable cover (not shown) that disguises the nature of the cookstove. Next cookstove and fixed to top of dresser in cabinet 192 is a sanitary tray or sink 195, also fitted when not in use with a demountable cover (not shown) that disguises the nature of the sink. By this means and by means of roof ventilator 196 in top of cabinet 192 and controlled by linkage 197 attached to operating knob 198, fresh air is carried to and the products of combustion, steam and odors of cookery are carried from cabinet 192 directly from the body without invading the passenger compartment. Parts 59, 91, 192, 193, 194 and 195 collectively constitute a cabinet-like sanitary kitchen service unit. Dresser 91 may comprise two vertically separated parts 200 and 201, one fitted with shelves 202 for the storage of clothing and toilet articles, the other fitted for the storage behind door 203 of foodstuffs for preparation and consumption on table 135 in sitting posture. The backside of the compact group of upper and lower minor enclosures including parts 91, 90, 92, 192, 200, 201, 202 and 203, is coincidental with transverse bulkhead 207 which extends well ahead of the axes of the rear roadwheels and between wheelwells 179*l* and 179*r*, this bulkhead together with parts of wardrobes 90 and underside of worktop 91 effectively shutting the rest of the passenger compartment off from the rear end compartment of the body immediately back of said bulkhead. Units of identical dimensions with divisions 200 and 201 may be fixed therein, such as food cold-storage unit operated by water ice, Dry Ice or mechanical refrigeration. The single rear seat 171 is shown in Fig. 12 replaced with a unit 204, such as a combined dresser and toilet commode having a permanent work top and/or cupboard thereabove and a combustion burner space heater 205 and having exhaust pipe 306 carried outside body 1 may heat a circulation of water through pipes 185 and 186 to provide winter warmth when the body 1 is parked. The asymmetrical structure illustrated in Figs. 9 to 12, makes possible in a body approximating only 200 cubic feet a much greater fluidity of design than hitherto has been possible with the interior arrangements fixed symmetrically relative to the lengthwise center axis *j—k*.

To recapitulate: on a wheelbase under 120″ and a tread under 56″ and with overall dimensions under 6′ x 6′ x 16′, the invention achieves a body slightly roomier than, if similar in appearance to, a modern motorcar of the low-slung streamlined stock type primarily useful in local family transport and transversely divided to have a major passenger-driving compartment wholly separate from two minor compartments occupying the entire ends of the body below transparent opposite end walls of the major compartment. This major compartment has a floor extending from the back of the front wheelwells to the front of the rear wheelwells and ending forward and below an axle for the rear roadwheels. This motorcar may be 90–98 per cent completed to the point of installing certain interior parts of the body and may then be finished in the conventional manner: i. e., with these interior parts installed in balanced symmetry to impose as equal a load as possible on each of the road wheels so that the vehicle may be of use primarily in swift local or long-distance transport. Or, this motorcar may have the final interior parts of the body installed according to the invention in unbalanced asymmetry relative to both the lengthwise and crosswise center axes of the body to make the body easily convertible, even while in motion, to use as a minimal family housekeeping apartment, adequate winter and summer, mobile and parked, to the temporary dwelling needs of an entire family of American average size for habitable health and comfort and decency.

By "unbalanced asymmetry" is meant fixing to lie unequally on opposite sides of the lengthwise center axis of the body: (*a*) a front seat, (*b*) a rear seat, (*c*) a table, (*d*) a lower berth, (*e*) an upper berth; at the same time fixing to lie only on one side of that axis: (A) a front single seat, (B) a rear single seat, (C) a heat-exchanger, (D) a combustion burner, (E) a sanitary sink, (F) a toilet commode, (G) a lengthwise foot-passage, in part, of less than aisle width. Relative to the crosswise center axis of the body, the "unbalanced asymmetry" consists of placing the entire powerdrive unit at one end of the body and, in addition, of fitting the same end of the body with upper and lower minor enclosures extending transversely between the rear wheelwells and in front of and across the rear window and forward of the rear axle and manually accessible from the major compartment but closed to the minor rear compartment.

The objects of the invention are thus achieved by means upsetting the more equal distribution of design and live load aimed at in the prior art. It is obvious that the invention concentrates a greater load on the rear wheels and on the right side of the body. Operating at the high speeds expected of a modern car, a motorcar having the unbalanced asymmetry thus described might normally be expected to be difficult on a windy day to keep on the road because of end and side heaviness tending to sluing. To overcome this unbalance relative to the lengthwise center axis of the body, the backbone may be moved very slightly to the right to bring the turning axis into balance with the load imposed on it. To overcome this unbalance relative to the crosswise center axis of the body, a special suspension system operative by leverage is provided that has a principal fulcrum closest to the heavy end of the body. Since the filing of application Serial No. 458,270 above mentioned, further study of the problems raised by the asymmetry of this design led to even more effective solutions described in my co-pending applications Serial No. 540,774 filed June 17, 1944, now Patent No. 2,525,988, and Serial No. 170,897 filed June 28, 1950. By the instant invention and the mentioned co-pending inventions, I have overcome the ill effects otherwise inevitable in a high-speed vehicle having such a very unbalanced asymmetrical structure.

It will be noted that the versatile structure described is housed in a body of sedan type and of close to a form and volume universally accepted for such type and that column 59, while part of the primary body-stiffening support or framework is also part of the group of upper and lower minor enclosures which include a food storage enclosure, a sanitary tray enclosure, a cookery enclosure for a means of heat transfer, an enclosure for the storage of clothing and at the same time is a principal support for convertible components of both lower and upper berths of a sleeping unit for the horizontal repose of four adult passengers at the same time, some of said components being mounted for pivotal movement on column 59. Bulkhead 207 extends between rear wheelwells 179*r* and 179*l* and may constitute the backside of dresser 91 and wholly separate passenger compartment 97 from minor rear end compartment 66 taking up all of the body behind and below rear window 21 in the back end of compartment 97. It will also be noted that the underside of the top of said compartment 97 nowhere covers a vertical space sufficient for average adult standing posture.

From the foregoing, it is apparent that the invention makes possible for the first time a family car of the stock type primarily useful in occasional, limited and luxury transport 5 per cent of the total time in step with customary practice and public acceptance, but a car convertible in the final finish of a stock car in manufacture or thereafter by simple means to common domestic housekeeping usage 100 per cent of the time. It is to be noted that this conversion may be made while the car is in motion and all the facilities of habitation may be as useful on the highway and at full speed, as when parked off the highway.

By thus turning what unwittingly already has become one room in the total shelter of the average American family to wider use and stressing mass utility instead of styling, the invention achieves not only a car having some slight adaptation to the needs of long-distance family touring, but accomplishes the primary object: a practical means of implementing and temporarily maintaining a state of mass diffusion from congested areas threatened with atomic attack.

It is commonly acknowledged that the physical structures of congested areas are doomed once atomically attacked. The real problem is: how sensibly to save the lives of the inhabitants of cities thus marked for destruction and temporarily house them so that the business of resistance may go on in spite of the chaos engendered? Americans own as many motorcars as dwellings: 30,000,000 cars. If these cars were built as taught herein and if the civilian masses, against whom the next war acknowledgedly will be waged, were trained to diffuse in an orderly fashion to points prepared in advance and to occupy their convertible motorcars as temporary family dwellings till the danger passed, then one of the greatest problems to face the coming generation would have found a simple, economically sound and eminently satisfying solution.

The drawings, being illustrative only, are more or less diagrammatic in character to show the preferred relation of parts and it will be understood that changes may be made in certain parts without vitally altering the character of the whole or departing from the spirit and scope of this invention as set forth in the appended claims; and all changes which come within the meaning and range of equivalency of the claims are therefore intended to be embraced therein.

Having thus broadly defined and fully described my invention, its utility in motion and at rest, and its mode of operation and conversion, what I claim and desire to secure by Letters Patent of the United States is:

1. In an automobile of principal use in local transport, a body of the family-car type on roadwheels fore and aft and having a versatile structure comprising a compartment of fixed volume for a driver and 4-5 passengers extending from forward to rearward body barriers: the forward barrier including a windshield above driving controls behind said fore wheels and the rearward barrier including a bulkhead fixed across the lengthwise center axis of the body ahead of axes of the aft wheels and two forward-facing seats each having components fixed across said axis between doors in opposite sides of the compartment and a forward-facing housekeeping unit consisting of a cabinet for the cold storage of food, said cabinet backed by said bulkhead and having a work-top astride said axis and a cookstove fixed to said worktop to permit a passenger positioned ahead of one of said components to utilize said unit while other passengers use said components to sit rearward facing or to lie horizontally thereon in swift transit alongside the driver behind said controls.

2. A space-saving housekeeping structure in the passenger compartment of a family-car type of body on fore and aft pairs of roadwheels, the compartment between said pairs having a fixed volume little more than adequate for the local transport of a driver and 4-5 passengers in forward-facing sitting posture and having an inner maximum height insufficient to permit adult standing posture, the back end of said compartment having a transverse bulkhead fixed between wheelwells for the aft pair of roadwheels and ahead of the axes thereof, said structure consisting of a forward-facing minor enclosure extending above and forwardly of said bulkhead and directly back of seating means fixed crosswise of said compartment, said minor enclosure having a transparent front side directly ahead of a rear-view window in the back end of said compartment, the bottom of said minor enclosure constituting a worktop, a cookstove housed within said minor enclosure and said transparent frontside comprising a closure opening to make said cookstove directly manually accessible to a passenger positioned ahead of said enclosure and closing to shut cooking fumes into said minor enclosure and out of that part of said compartment occupied by said passengers.

3. In a family car mainly for local transport, a rigidly enclosed body on fore and aft pairs of roadwheels and having above the body floor a fixed volume little more than adequate to seat a driver and 4-5 forward-facing passengers between said pairs and within a maximum vertical body space nowhere sufficient to permit an average adult to stand erect, and a versatile structure including a unit for the repose prone of most of said passengers at the same time, components of the rear end of said unit being supported by a body member above said floor for pivotal movement on said member, upper and lower components of the front end of said unit being supported by said floor on a pair of yieldingly resilient side spring members permitting relative vertical displacements in swift transit between a forepart of said floor and upper and lower components of said unit.

4. In an automobile of the family-car type of primary use in local transport, a compartment having a glazing in a side portion thereof, said compartment of fixed volume little more than adequate between fore and aft roadwheels to house well-spaced front and rear transverse seats for a driver and four passengers, a pair of said seats fixed astride the lengthwise center axis of the body and the foreseat of said pair having resilient side supports attached to the floor of the compartment, and a unit convertible in part from components of said pair for the in-transit horizontal repose of said four passengers, said unit extending asymmetrically astride said axis along one side of said compartment, the front end of said unit spaced back of the front roadwheels and the rear end of said unit spaced ahead of the back roadwheels; said unit comprising upper and lower double berths, the upper berth having a stiff tubular frame supported at one end for pivotal movement on an upright body member, the opposite end of said frame having spaced diagonal side braces supported for vertical displacement relative to said floor by said resilient side supports and the lower berth comprising in part a bottom cushion fixed between said side supports of said foreseat, an egress door in the opposite side of said compartment between fore and aft roadwheels and a foot passage substantially of aisle width directly behind the seat for said driver and extending wholly on one side of said axis along the innermost side of said unit to said door to provide recumbent occupants of both said berths direct, swift unobstructed exit from said body in an emergency.

5. The structure of claim 4 wherein the topside of said tubular frame of said upper berth extends at the approximate level of the lower half of said glazing and the topside of said lower berth extends at the approximate level of the tops of said roadwheels.

6. The structure of claim 4 wherein the back cushion of said foreseat is fastened to said bottom cushion by adjustable means allowing said back cushion to be swung in a vertical arc and fixed at any one of a number of different angles relative either to the front edge or the back edge of said bottom cushion to permit two of said passengers to sit rearward-facing or forward-facing independent of said driver.

7. The structure of claim 4 wherein an upholstered boxlike receptacle for holding the demounted components of said upper berth forms part of the back end of said lower berth.

8. In an automotive body of rigidly enclosed family-car type, a compartment having between fore and aft pairs of roadwheels a fixed volume little more than adequate for a driver and 4-5 passengers to sit in well-spaced front and back seats fixed astride the lengthwise center axis of the body: said compartment having a versatile structure consisting of a stock vertical section of the body extending on opposite sides of said axis from behind the back cushion of said back seat to a bulkhead secured across the body between foreparts of wheelwells for the aft roadwheels and, at higher level, extending from above the top of said back cushion to a rear-view window in the back end of said compartment, said vertical section enclosing a space between the bottom and fixed top of the compartment substantially less than the height of an average adult passenger but sufficient to receive a service group of upper and lower minor enclosures having forward-facing openings to make the cabinet-like interiors of the enclosures directly manually accessible to a passenger positioned ahead of said group: one of said minor enclosures for cookery having sanitary sidewalls enclosing a fixed cookstove, and a transparent opening closure across the front opening of the enclosure to keep cooking fumes within the enclosure and out of the compartment forwardly thereof while permitting a clear view through said window.

9. The structure of claim 8 wherein a dresser worktop extends between said back cushion and said window to support a sanitary tray between said sanitary sidewalls.

10. The structure of claim 8 wherein one of said minor enclosures for the cold storage of food has a worktop extending between said back cushion and the back end of said compartment below said window.

11. In a family car of principal use in local transport, a sedan-type body of fixed volume supported on roadwheels in fore and aft pairs of wheelwells, a midportion of the body having a maximum inside width less than adequate to seat abreast four forward-facing human adults and an inside height everywhere less than sufficient to permit said adults to stand erect, said midportion extending from forward to rearward transverse body barriers, the forward barrier including a transparent windshield behind said fore pair of wheelwells and the rearward barrier including a bulkhead fixed across the body between foreparts of the aft pair of wheelwells; said midportion having a versatile structure including two units astride the lengthwise center axis of the body: one unit a group of minor enclosures for emergency housekeeping fixed ahead of said bulkhead, the other a unit of sectional components for horizontal repose in swift transit, some of said components comprising parts of a rearward-facing front seat for two passengers convertible in transit to be aligned crosswise of said midportion with a seat for the driver, said front seat having a back forwardly inclined and adjustable means of swinging said back from rearward to forward facing while said back remains asymmetrically astride said axis.

CORWIN D. WILLSON.

References Cited in the file of this patent

UNITED STATES PATENTS

| Number | Name | Date |
|---|---|---|
| 1,163,056 | Zimmerman | Dec. 7, 1915 |
| 1,592,269 | Horine | July 13, 1926 |
| 1,658,110 | Warren | Feb. 7, 1928 |
| 1,796,112 | McArthur, Jr. | Mar. 10, 1931 |
| 2,070,758 | Spatz | Feb. 16, 1937 |
| 2,074,354 | Ash | Mar. 23, 1937 |
| 2,128,930 | Fageol et al. | Sept. 6, 1938 |
| 2,190,551 | Swallow | Feb. 13, 1940 |
| 2,201,252 | Van Ranst | May 21, 1940 |
| 2,234,781 | Schjolin | Mar. 11, 1941 |
| 2,421,351 | Page | May 27, 1947 |

FOREIGN PATENTS

| Number | Country | Date |
|---|---|---|
| 209,466 | Great Britain | Jan. 7, 1924 |
| 336,478 | Italy | Feb. 17, 1936 |
| 629,724 | France | Aug. 2, 1927 |

OTHER REFERENCES

A "Motorlounge," page 1212 of "The Autocar" Magazine of December 18, 1936.